United States Patent [19]

Brundage et al.

[11] Patent Number: 5,410,567
[45] Date of Patent: Apr. 25, 1995

[54] OPTICAL FIBER DRAW FURNACE

[75] Inventors: Kevin R. Brundage, Corning; David J. Ulrich, Burdett, both of N.Y.

[73] Assignee: Corning Incorporated, Corning, N.Y.

[21] Appl. No.: 847,756

[22] Filed: Mar. 5, 1992

[51] Int. Cl.$^6$ .............................. F27D 1/00
[52] U.S. Cl. ..................... 373/137; 373/130; 373/155; 219/635; 266/280
[58] Field of Search ........ 219/10.491, 10.41, 10.55 D, 219/10.57, 10.75, 10.61 R, 635, 637, 638; 427/237; 428/116; 165/166; 432/234; 65/134; 373/72, 71, 138, 139, 18, 130, 137, 155; 75/10.12, 10.14; 422/248; 266/280, 286

[56] References Cited

U.S. PATENT DOCUMENTS

| | | | |
|---|---|---|---|
| 3,112,184 | 11/1963 | Hollenbach | 264/59 |
| 3,401,226 | 9/1968 | Renkey | 373/138 |
| 3,427,390 | 2/1969 | Renkey et al. | 373/138 |
| 3,429,975 | 2/1969 | Renkey | 373/139 |
| 3,444,925 | 5/1969 | Johnson | 165/166 |
| 3,790,654 | 2/1974 | Bagley | 264/177.11 |
| 3,860,737 | 1/1975 | Moscatello | 219/10.61 R |
| 3,898,051 | 8/1975 | Schmid | 373/138 |
| 4,015,636 | 4/1977 | Van Fossen | 432/234 |
| 4,054,702 | 10/1977 | Lundsager | 428/167 |
| 4,142,063 | 2/1979 | Boniort et al. | 373/138 |
| 4,228,826 | 10/1980 | Campbell | 138/149 |
| 4,450,333 | 5/1984 | Andrejco | 219/10.49 R |
| 4,461,323 | 7/1984 | Morikawa | 138/115 |
| 4,533,378 | 8/1985 | Paek | 219/10.49 R |
| 4,547,644 | 10/1985 | Bair | 219/10.49 R |
| 4,608,473 | 8/1986 | Paek et al. | 219/10.49 R |
| 4,610,711 | 9/1986 | Matesa et al. | 65/134 |
| 4,723,996 | 2/1988 | Brunet et al. | 75/10.14 |
| 4,735,826 | 4/1988 | Roba | 427/237 |
| 4,877,670 | 10/1989 | Hamanaka | 428/116 |
| 4,877,766 | 10/1989 | Frost | 502/439 |
| 5,132,984 | 7/1992 | Simpson | 373/18 |
| 5,134,261 | 7/1992 | Larkin et al. | 219/10.41 |
| 5,218,615 | 6/1993 | Wieland et al. | 373/71 |

FOREIGN PATENT DOCUMENTS 2022071  5/1979  United Kingdom .

Primary Examiner—Bruce A. Reynolds
Assistant Examiner—Tu Hoang
Attorney, Agent, or Firm—W. J. Simmons, Jr.

[57] ABSTRACT

An induction furnace for heating a portion of an optical preform in order to draw an optical fiber therefrom. The furnace includes a tubular susceptor which is disposed centrally within a housing. The electromagnetic field from a high frequency coil surrounding the susceptor is coupled to the susceptor to heat and reflow a portion of the preform. A cellular refractory tubular insulator is located between the coil and the susceptor.

20 Claims, 3 Drawing Sheets

OPTICAL FIBER DRAW FURNACE

FIELD OF THE INVENTION

This invention relates to a high temperature furnace, and more particularly, to an optical fiber draw furnace.

BACKGROUND OF THE INVENTION

Relatively high temperature heat sources are required for drawing high strength, low loss, high silica-content optical fiber from a preform or draw blank. Induction and resistance furnaces have generally been employed for drawing such silica fibers. Resistance furnaces, which typically are made of carbon, require an inert, protective atmosphere to prevent oxidation of the heating element.

An induction furnace conventionally includes a housing in which there is centrally disposed a tubular, yttria-stabilized zirconia susceptor surrounded by a cylindrical quartz beaker containing granular zirconia insulating material. The insulating material is commonly referred to as insulating grain or grog. An induction coil surrounding the beaker provides an alternating electromagnetic field that couples to the preheated zirconia susceptor, elevating the temperature thereof and forming a hot zone therein. A glass preform is introduced into the hot zone, a portion of the preform is reflowed, and optical fiber is drawn therefrom. Although such furnaces have been effective for drawing optical fiber, microscopic particles of zirconia (typically 1–10 μm) migrate from the insulating grain and deposit on the preform or the fiber being drawn; these particles readily penetrate the surface due to its low viscosity. The resultant discontinuities in the fiber surface can constitute localized fracture centers which reduce the mechanical performance of the fiber, and, in particular, reduce its tensile strength.

Techniques used to reduce the migration of zirconia particles from the susceptor tube are described in U.S. Pat. Nos. 4,533,378 and 4,735,826. A thin coating of material compatible with the susceptor material is deposited on the inner surface of the susceptor to prevent the migration of particles from the zirconia grog to the preform. In one of the disclosed embodiments, the deposited material is the same material (e.g. silica) as the preform heated therein. However, if cracks of sufficient thickness occur in the susceptor, the migration of zirconia particles resumes. Apparently such cracks are too large to be filled with the coating material, whereby microscopic particles from the insulating zirconia grain surrounding the susceptor can be drawn therethrough and deposit on the preform and/or drawn fiber.

U.S. Pat. No. 4,450,333 teaches that the migration of zirconia particles originating at the insulating grain can be reduced by providing the induction furnace with a sleeve interposed between the insulating grain and the susceptor. The lower ends of the susceptor and sleeve are supported on a bottom surface of the beaker and form a joint therewith. Because of the manner of support, contaminating dust is likely to enter the furnace bore through this joint. Also, the susceptor and sleeve are capable of shifting laterally on the beaker support surface; this could cause inadvertent increases in the size of gaps between the susceptor and sleeve and the beaker base as well as misalignment of the furnace bore with the preform-fiber centerline.

Zirconia particles originating at the insulating grain can also enter the furnace bore between the susceptor and the base on which it is supported, or between the top of the susceptor and the end disc through which the preform extends into the furnace bore. U.S. Pat. No. 4,547,644 teaches a sealing arrangement for each end of the fiber drawing furnace, thereby minimizing the number of access paths for zirconia dust to the furnace bore. The furnace includes a tubular susceptor which is disposed centrally within a beaker and a sleeve which is disposed concentrically about the susceptor. The sleeve is spaced from the susceptor and is surrounded by insulating grain. The movement of contaminating particles from the insulating grain into the interior of the susceptor is reduced by annular, felt-like discs at the bottom and top of the beaker.

Notwithstanding the deployment of the aforementioned susceptor coatings and furnace equipment, zirconia particles from the insulating grain have been found to migrate to the preform and/or drawn fiber.

Accordingly, there is a need for eliminating from the furnace bore particles originating at the insulator that is disposed between the susceptor and high frequency coil. When considering a replacement for the standard zirconia grog insulator, its ability to withstand high, fiber drawing temperatures and its effect on power consumption must be taken into consideration. A furnace utilizing a non-grog insulator should consume little or no more power than a standard zirconia grog furnace.

SUMMARY OF THE INVENTION

The present invention generally pertains to a furnace comprising centrally located heating means surrounded by insulating means composed of a plurality of segments, each segment being a cellular structure of refractory material. The insulating means can be formed of a refractory metal such as FeCrAl or a high temperature ceramic material such as an oxide, nitride, carbide, or a blend of such oxides. Some specific preferred oxides are oxides of zirconium, magnesium, aluminum, calcium, yttrium and mixtures thereof.

In a preferred embodiment, the furnace is an induction furnace for heating an optical fiber preform and drawing a fiber therefrom. Such a furnace has a centrally located tubular susceptor surrounded by an induction coil, and a cylindrically-shaped insulator disposed between the susceptor and the coil. The segmented insulator comprises a plurality of segments that are interconnected by joints that extend perpendicular and parallel to the axis of the susceptor. The cells of the cellular structure can extend parallel to or perpendicular to the axis of the susceptor. The segments can be formed such that they overlap at the joints whereby there is no line of sight path through the insulator for radiation from the susceptor.

DESCRIPTION OF THE PREFERRED EMBODIMENTS

Figure 1:
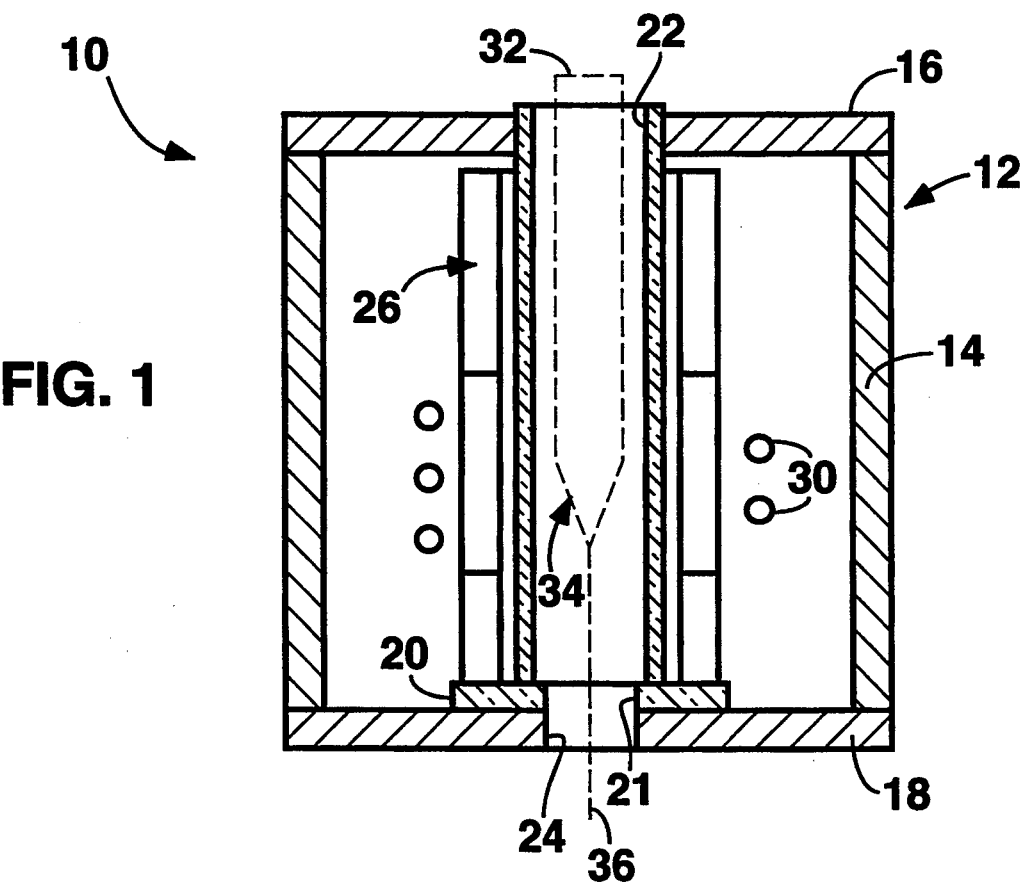
FIG. 1 is a schematic illustration of the optical fiber draw furnace of the present invention.

FIG. 1 depicts a high temperature induction furnace generally referred to by the numeral 10. The furnace 10 is comprised of a cylindrical housing 12 having a side wall 14, a top portion 16 and a bottom portion 18. Top portion 16 has a central opening 22 therein which is vertically aligned with an opening 24 in bottom portion 18. A cylindrically-shaped insulator 26 is axially disposed in housing 12. Insulator 26 is formed of a plurality of segments as shown in greater detail in FIGS. 3 through 8. A tubular susceptor 28, which is formed of yttria stabilized zirconium dioxide, is centrally located within insulator 26. Susceptor 28 may comprise a plurality of axial segments to reduce its tendency to crack. Susceptor 28 and insulator 26 are spaced from bottom portion 18 by a silica ring 20 having an aperture 21 through which the fiber is drawn. Ring 20 insulates susceptor 28 from bottom portion 18. An RF induction coil 30, which is connected to a power source (not shown), is mounted about insulator 26. Housing 12, which is water cooled, may be fabricated of copper or the like; it therefore functions as a shield to reduce stray radio-frequency fields.

Susceptor 28 is preheated by axially inserting a room temperature carbon rod (not shown) therein. As the temperature of the carbon rod exceeds 1000° C., susceptor 28 begins to couple to the electromagnetic field, and by approximately 1400° C., the carbon rod can be withdrawn without thermally shocking the susceptor. By this method the temperature of the furnace 10 is raised to the operating temperature over a period of time that is sufficiently long to prevent damage to the components thereof. During operation, the temperature of the zirconium dioxide susceptor 28 is monitored and controlled with an infrared pyrometer (not shown) to within ±2° C. of the desired set point. Fiber drawing temperatures are conventionally between 1900° C. and 2300° C. depending upon the size of the preform 32 and the fiber drawing velocity. Frequencies on the order of about 4 megahertz are required for efficient operation at those temperatures. There should be little or no coupling of the RF field to insulator 26. Thus, insulator 26 maintains an elevated temperature within susceptor 28 during operation.

An optical fiber preform 32 (shown in phantom) is axially inserted into susceptor 28 until a first end 34 thereof is positioned at the "hot zone" located within RF coil 30. After the temperature within susceptor 28 has reached the desired level (e.g. about 2000° C.), an optical fiber 36 is drawn from the root portion of the preform at end 34.

Heretofore, insulator 26 has been composed of a course zirconium dioxide grain or grog situated in a container such as a silica beaker. Although optical fibers have been drawn from zirconia grog-insulated induction furnaces for over ten years, such furnaces are disadvantageous in that very small particles of zirconium dioxide have been found to migrate from the grain to the preform and/or fiber. Such contamination results in low strength fiber and decreases fiber production yields.

In accordance with the present invention, insulator 26 consists of a cylindrically-shaped, thin-walled cellular structure formed of refractory ceramic or metallic material. Such cellular ceramic structures are disclosed in U.S. Pat. Nos. 3,112,184, 3,444,925, 3,790,654, 4,054,702, 4,461,323, 4,877,670 and 4,877,766, and in U.K. Patent Application GB 2,022,071. Techniques such as extrusion, co-wrapping of corrugated/flat sheets, and the like have been employed for making such cellular structures. Ceramic devices having cell densities greater than 1000 cells/in$^2$ (155 cells/cm$^2$) have been formed by extrusion. A number of advantages result from using insulators having higher cell densities: (a) furnace diameter can be decreased; (b) larger preforms can be processed; and (c) the coil-to-susceptor spacing can be decreased, thereby reducing power consumption. The cells of insulator 26, which generally extend parallel to or perpendicular to the furnace vertical axis, can be square (FIG. 2), hexagonal, keystone-shaped (annular and radial intersecting walls) or the like. Various high temperature oxides that can be considered for use in insulator 26 are oxides of zirconium, magnesium, aluminum, calcium, yttrium and mixtures thereof, depending on fiber draw temperature. The maximum use temperatures of MgO and Al$_2$O$_3$, for example, are 2300° C. and 1850° C., respectively. However, cracking can limit the lifetime of an insulator operated at a temperature near its maximum use temperature, since temperature gradient and thermally induced stresses are highest at such temperatures. Segmented designs to be discussed below reduce stress and allow the use of a given material at a higher temperature as compared to the temperature to which a monolithic insulator of the same material could be subjected. All indications suggest that carbides and nitrides would also be usable, given atmosphere control, frequency tuning of the RF generator, and appropriate selection of the susceptor material. A zirconia insulator can be subjected to a maximum temperature of 2300° C., but it has a low resistivity and will suscept the RF field when used in long axial lengths. It is thought that a zirconia insulator formed of axial and azimuthal segments may exhibit a sufficiently high resistance to enable it to be employed in cellular form as a draw furnace insulator. Zirconia would need to be stabilized, e.g. by the addition of 4–5 wt. % MgO, to reduce the detrimental effects of phase transition volume changes. Blends of the aforementioned compositions could also be used.

At operating temperatures of optical fiber draw furnaces, radiation is the largest thermal loss mechansim. Each of the walls of a cellular ceramic insulator functions as a radiation barrier. In addition, the thin walls of the cellular ceramic insulator reduce conduction losses. In order to determine the required number of barriers for a susceptor temperature of 2000° C. and an ambient temperature of 25° C., the losses through a series of radiation barriers were estimated. Table 1 gives the operating temperatures of the individual barriers and the additional losses associated with the number of barriers in the assembly. Excess loss is that loss incurred in addition to the loss exhibited by a standard zirconia grog furnace. These estimates were made for concentric tubes of infinite length, with close spacing and no transmission.

TABLE 1

|  | Case 1 | Case 2 | Case 3 | Case 4 |
|---|---|---|---|---|
| Susceptor | 2000 C. | 2000 C. | 2000 C. | 2000 C. |
| Barrier 1 | — | 1640 C. | 1780 C. | 1917 C. |
| Barrier 2 | — | — | 1450 C. | 1827 C. |
| Barrier 3 | — | — | — | 1707 C. |
| Barrier 4 | — | — | — | 1577 C. |
| Barrier 5 | — | — | — | 1427 C. |
| Barrier 6 | — | — | — | 1127 C. |
| Ambient | 25 C. | 25 C. | 25 C. | 25 C. |
| Excess Loss | 90 KVA | 45 KVA | 30 KVA | ~0 KVA |

Case 1 is a bare susceptor with no insulation. Case 2 is for one barrier, and Case 3 is for two barriers. They are included to show the dramatic reduction in losses with the first two barriers. Case 4 shows the operating temperatures of the individual barriers in an array that reduces power losses to approximately the current level in zirconia grog-insulated induction furnaces. At this number of barriers, one additional barrier saves about 1 KVA and one less barrier loses about 2 KVA. The importance of this is that once there is enough insulation, more barriers have a small impact on total heat rejection but will raise the temperature of all the barriers, and potentially eliminate a candidate material due to the operating temperature of the first barrier.

Figure 2:
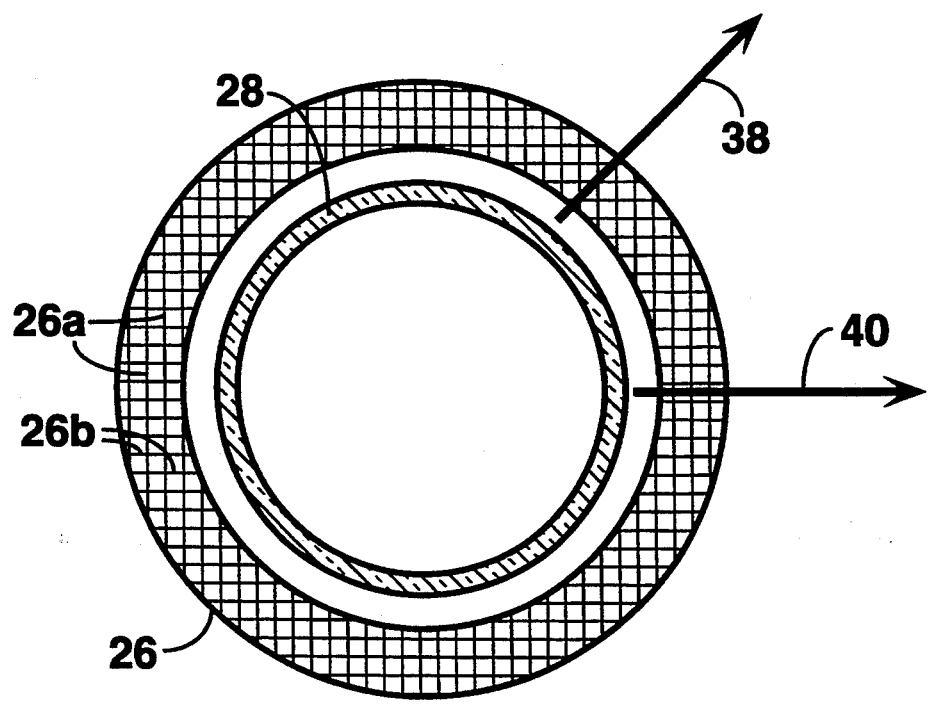
FIG. 2 is a schematic illustration of the furnace susceptor and insulator.
Figure 3:
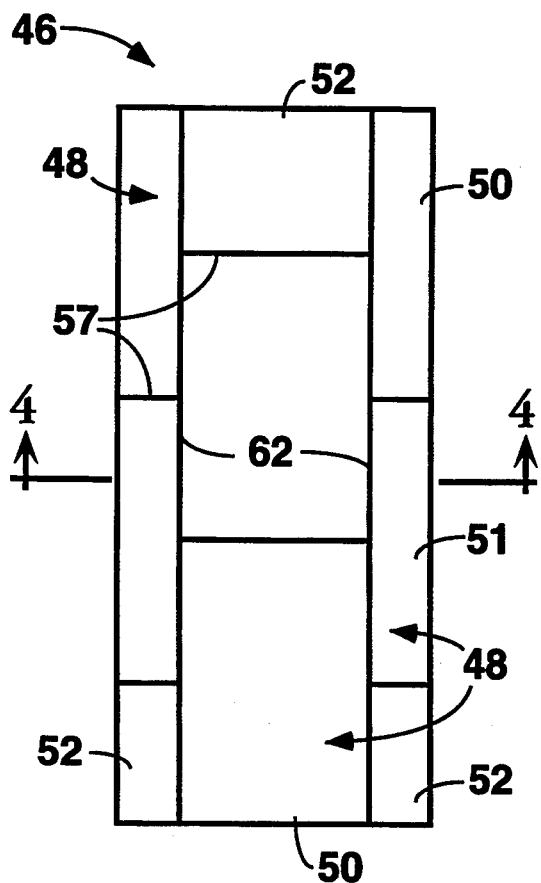
FIG. 3 is an side elevational view of an eight-sided, segmented cellular insulator.

In FIG. 2, arrows 38 and 40 represent components of radiation from susceptor 28. Cell walls 26a and 26b present effective radiation barriers even though they are not orthogonally disposed with respect to radiation. In this figure, radiation component 40 propagates through five barriers, and radiation component 38 propagates through seven barriers. The minimum number of barriers seen by all of the radiation components should be five for the insulator to be efficient. If energy consumption is of no concern, fewer than five barriers can be used, but a minimum of three barriers is required to protect the coil.

Figure 6:
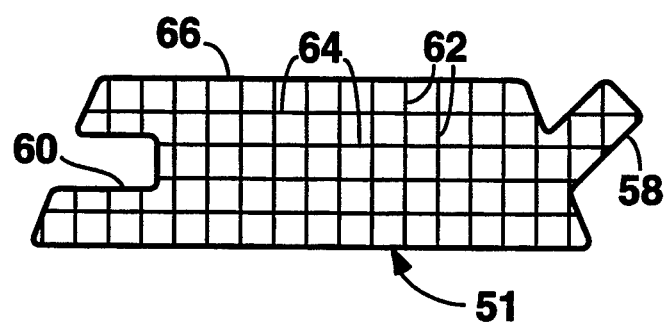
FIG. 6 is a cross-sectional view taken along lines 6—6 of FIG. 5.
Figures 5, 7:
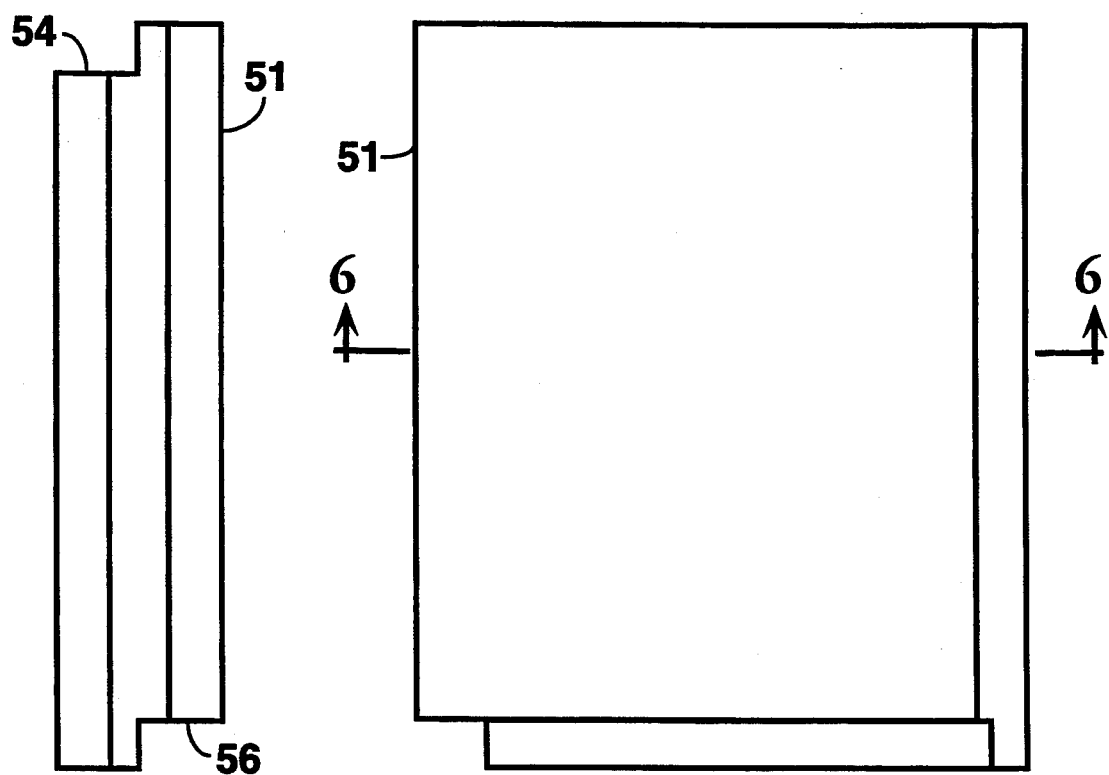
FIG. 5 is a front elevational view of one of the segments of the insulator of FIG. 3.
FIG. 7 is a side elevational view of an insulator segment.

In the embodiment, shown in FIGS. 3–7, insulator 46 is formed of eight vertical sections 48, which extend parallel to the vertical furnace axis. Whereas the cross-sectional shape of insulator 46 is shown as being hexagonal (taken in a plane perpendicular to the furnace axis), it could also be circular or the like. Each section 48 consists of two long segments 50 and 51 and a short segment 52. Each middle segment 51 was fabricated as shown in FIGS. 5–7, whereby steps 54 and 56 were ground at the top and bottom thereof. Each top and bottom segment has a step ground only at the bottom or top thereof, respectively; thus, those segments coact with segment 51 to form horizontal joints 57. Because of the overlapping feature of the joints, there is no line of sight path through the insulator for radiation from the heated susceptor. Horizontal joints 57 are staggered to provide mechanical strength.

The central portion of susceptor 28 is conventionally heated to a higher temperature than the ends thereof. The vertically stacked segments shown in the drawings are required for such non-isothermal conditions. Table 1 shows that there is a temperature differential of about 800° C. between the inner and outer surface of an insulator having six barrier layers for a susceptor temperature of 2000° C. The temperature differential at a susceptor temperature of 2200° C. would be about 1000° C. Hoop stress in an insulator operated at such high temperatures would cause a monolithic insulator to crack vertically at a plurality of locations.

Each segment is provided with a tongue 58 and groove 60 (FIG. 6) to provide vertical joints 62 with mechanical strength and to eliminate direct thermal radiation leakage. FIG. 6 shows that the cellular insulator segments contain intersecting interior walls 62, 64 and an outer peripheral wall 66 which can be made thicker than the interior walls for strength purposes.

Whereas the cells of FIGS. 3–7 extend parallel to the axis of cylindrically-shaped insulator 46, segments could also be extruded such that the cells extend perpendicular to the insulator axis.

Figure 8:
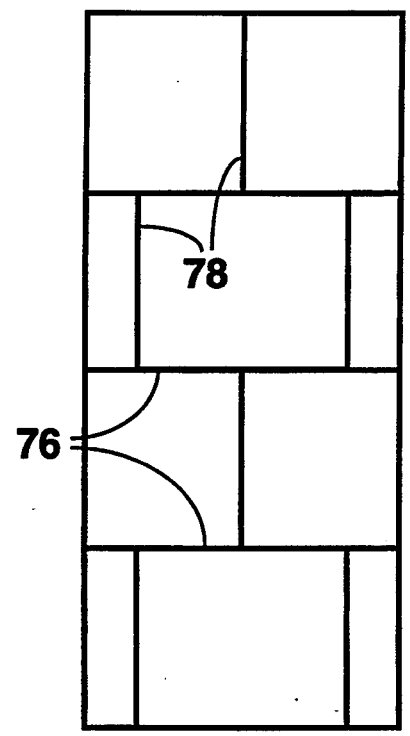
FIG. 8 schematically illustrates a further embodiment of the invention.
Figure 4:
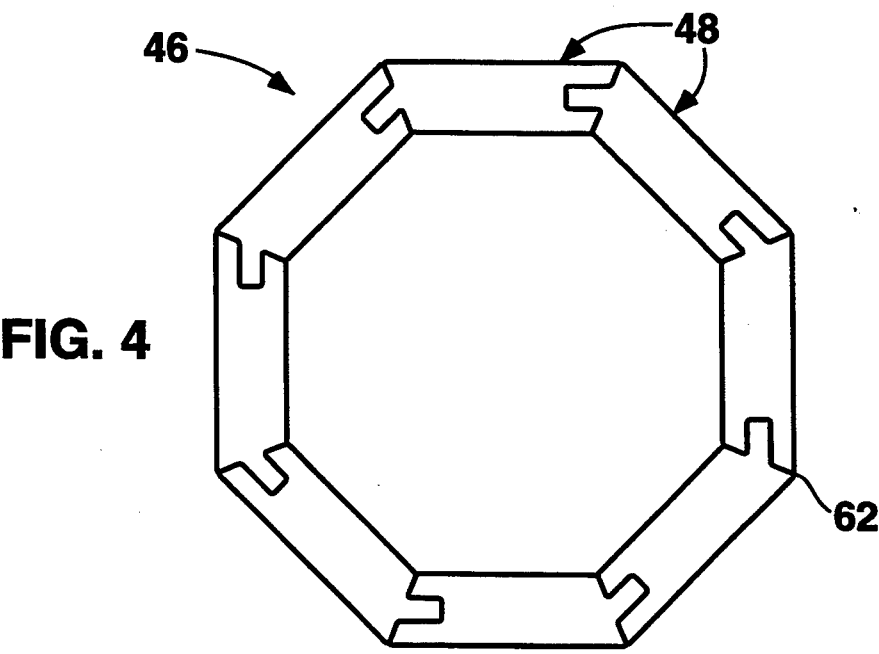
FIG. 4 is a cross-sectional view taken along lines 4—4 of FIG. 3.

In the modification shown in FIG. 8, horizontal joints 76 are not staggered, but vertical joints 78 can be staggered, such as in a circular design.

An induction furnace of the type shown in FIG. 1 was used to draw high silica content optical fiber. Insulator 26 was fabricated in the manner shown in FIGS. 3–7. Segments 50, 51 and 52 were extruded from an 80% MgO 20% $Al_2O_3$ blend, the cell density being 100 cells/in$^2$ (15.5 cells/cm$^2$). The total height of eight-sided insulator 46 was about 25.5 cm, the heights of the outer surfaces of segments 50 and 51 being 10.2 cm and that of segment 52 being 5.1 cm. Some segments were initially made slightly longer than the aforementioned lengths to allow for the grinding of the steps therein.

The furnace was heated up normally and achieved normal forming temperatures at normal power requirements (viz. 2100°–2200° C. @ 18–19 KVA). The segmented design eliminated all cracking in the insulator. The furnace lasted 12 days in normal service.

Break Source Analysis showed that no material from the cellular ceramic insulator was present on the fiber.

We claim:

1. A furnace comprising centrally located heating means surrounded by cylindrically-shaped insulating means having a longitudinal axis, said insulating means being composed of a plurality of segments, each segment being a cellular structure of refractory material, wherein cells of said cellular structure extending parallel to said axis of said insulating means.

2. A furnace in accordance with claim 1 wherein said cellular structure is formed of high temperature ceramic material.

3. A furnace in accordance with claim 2 wherein said cellular structure is formed of a material selected from the group consisting of oxides, nitrides, carbides, and blends thereof.

4. A furnace in accordance with claim 2 wherein said cellular structure is formed of a material selected from the group consisting of oxides of zirconium, magnesium, aluminum, calcium, yttrium and mixtures thereof.

5. A furnace in accordance with claim 1 wherein said insulating means is cylindrically-shaped and has a longitudinal axis, and wherein said cellular structure is formed of cells that extend along planes that are parallel to the axis of said insulating means.

6. A furnace comprising centrally located heating means surrounded by cylindrically-shaped insulating means having a longitudinal axis, said insulating means being composed of a plurality of segments, each segment being a cellular structure of refractory material, wherein cells of said cellular structure extending perpendicular to said axis of said insulating means.

7. A furnace comprising centrally located heating means surrounded by cylindrically-shaped insulating means having a longitudinal axis, said insulating means being composed of a plurality of segments, each segment being a cellular structure of refractory material, said segments being connected together at joints extending parallel to said axis of said insulating means.

8. A furnace in accordance with claim 7 wherein said segments overlap at said joints whereby there is no line of sight path through said insulating means for radiation from said heating means.

9. A furnace in accordance with claim 1 wherein said insulating means is cylindrically-shaped and has a longitudinal axis, said segments being connected together at joints extending perpendicular to the axis of said insulating means.

10. A furnace comprising centrally located heating means surrounded by cylindrically-shaped insulating means having a longitudinal axis, said insulating means being composed of a plurality of segments, each segment being a cellular structure of refractory material, said segments being connected together at joints extending perpendicular to said axis of said insulating means, and said segments overlapping said joints whereby there is no line of sight path through said insulating means for radiation from said heating means.

11. In an induction furnace for heating an optical fiber preform and drawing a fiber therefrom, the furnace having a centrally located tubular susceptor surrounded by an induction coil, and a cylindrically-shaped insulator disposed between said susceptor and said coil, said susceptor having a longitudinal axis, said insulator comprising a plurality of segments that are interconnected by joints that lie in planes that extend substantially perpendicular and parallel to the axis of said susceptor, each segment being a cellular structure of refractory material.

12. A furnace in accordance with claim 11, wherein said cellular structure is formed of high temperature ceramic material.

13. A furnace in accordance with claim 12 wherein said cellular structure is formed of a material selected from the group consisting of oxides, nitrides, carbides, and blends thereof.

14. A furnace in accordance with claim 12 wherein said cellular structure is formed of a material selected from the group consisting of oxides of zirconium, magnesium, aluminum, calcium, yttrium and mixtures thereof.

15. A furnace in accordance with claim 11 wherein said cellular structure is formed of cells that extend parallel to the axis of said susceptor.

16. A furnace in accordance with claim 11 wherein said cellular structure is formed of cells that extend perpendicular to the axis of said susceptor.

17. A furnace in accordance with claim 7 wherein said segments overlap at said joints whereby there is no line of sight path through said insulating means for radiation from said heating means.

18. A furnace in accordance with claim 17 wherein said joints are tongue-in-groove joints.

19. A furnace for heating a preform in order to draw an optical fiber therefrom, said furnace comprising:
a container which includes a sidewall and a base having an opening therethrough,
a tubular element having a bore into which the preform extends, said tubular element being supported on said base in alignment with said opening and enclosed by said sidewall, said tubular element having a longitudinal axis,
means for heating said preform to a temperature of at least 1900° C., and
an insulator disposed between said sidewall and said tubular element, said insulator comprising a plurality of segments that are interconnected by joints that extend substantially perpendicular and parallel to the axis of said tubular element, each segment being a cellular structure of refractory material.

20. A furnace in accordance with claim 19 wherein said means for causing comprises an induction coil surrounding said insulator, said tubular element comprising a susceptor for energy from said induction coil.

* * * * *